US010538191B2

(12) United States Patent
Hooper et al.

(10) Patent No.: US 10,538,191 B2
(45) Date of Patent: Jan. 21, 2020

(54) REMOVAL/INSTALLATION APPARATUS FOR BOAT CAPTURE SYSTEM

(71) Applicant: United States Government, San Diego, CA (US)

(72) Inventors: Ralph David Hooper, Lemon Grove, CA (US); William A. Chambers, Jamul, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 15/851,056

(22) Filed: Dec. 21, 2017

(65) Prior Publication Data
US 2018/0264986 A1 Sep. 20, 2018

Related U.S. Application Data

(60) Provisional application No. 62/471,730, filed on Mar. 15, 2017.

(51) Int. Cl.
*B60P 3/10* (2006.01)
*B66C 1/36* (2006.01)
(Continued)

(52) U.S. Cl.
CPC ............... *B60P 3/1075* (2013.01); *B60P 3/10* (2013.01); *B62B 3/02* (2013.01); *B62B 3/04* (2013.01);
(Continued)

(58) Field of Classification Search
CPC ..... B60P 3/1033; B60P 3/1075; B60P 3/1066; B60P 3/1058; B60P 3/10
(Continued)

(56) References Cited

U.S. PATENT DOCUMENTS 2,827,304 A * 3/1958 Backus ................. B60P 3/1075
280/143
2,836,278 A * 5/1958 Kindell ................. B60P 3/1066
193/42
(Continued)

OTHER PUBLICATIONS

HMS London; Photo of Torpedo Cart; available online at http://www.hazegray.org/features/nato/uk/london/london3.jpg (accessed Oct. 28, 2019).*
(Continued)

*Primary Examiner* — Joseph M Rocca
*Assistant Examiner* — Conan D Duda
(74) *Attorney, Agent, or Firm* — Naval Information Warfare Center, Pacific; Kyle Eppele; J. Eric Anderson

(57) ABSTRACT

An apparatus for removing and/or installing a side guide of a trailer-mounted boat capture system for guiding a boat onto the trailer, the apparatus comprising: an outboard post pivotally attached to an upper support rail of the side guide; two inboard posts, each pivotally attached to the side guide proximal to where the side guide is attached to the trailer via first pins, wherein each inboard post includes a manual leveling jack; an attachment point on the side guide suitable for attaching a winch cable from a boat held in the boat capture system; and second pins attaching the side guide to the trailer such that when the first pins are removed the side guide is free to pivot around the second pins from an upright position towards a support surface.

20 Claims, 6 Drawing Sheets

(51) Int. Cl.
*B63B 21/54* (2006.01)
*F16B 45/02* (2006.01)
*B63B 21/60* (2006.01)
*B62B 3/02* (2006.01)
*B62B 3/04* (2006.01)
*B62B 5/04* (2006.01)
*B62B 5/06* (2006.01)
*A44B 13/02* (2006.01)
*B63B 27/16* (2006.01)
*B63G 8/00* (2006.01)

(52) U.S. Cl.
CPC ............ *B62B 5/0438* (2013.01); *B62B 5/067* (2013.01); *B63B 21/54* (2013.01); *B63B 21/60* (2013.01); *B66C 1/36* (2013.01); *F16B 45/02* (2013.01); *F16B 45/025* (2013.01); *A44B 13/02* (2013.01); *B62B 2005/0471* (2013.01); *B62B 2202/90* (2013.01); *B62B 2301/04* (2013.01); *B63B 2027/165* (2013.01); *B63G 2008/002* (2013.01)

(58) Field of Classification Search
USPC ....... 280/414.1; 114/45, 344, 343, 259, 263, 114/467, 482
See application file for complete search history.

(56) References Cited

U.S. PATENT DOCUMENTS

| | | | | | |
|---|---|---|---|---|---|
| 2,919,825 | A * | 1/1960 | Hornsby | ............... | B60P 3/1033 414/474 |
| 2,977,012 | A * | 3/1961 | Maunula | ............... | B60P 3/1075 414/534 |
| 3,021,969 | A * | 2/1962 | Peake | ................... | B60P 3/1075 414/533 |
| 3,031,093 | A * | 4/1962 | Holsclaw | ............... | B60P 3/1075 414/533 |
| 3,447,815 | A * | 6/1969 | West | .................... | B60P 3/1075 280/144 |
| 3,455,472 | A * | 7/1969 | Rankin, Jr. | ........... | B60P 3/1075 414/534 |
| 3,540,610 | A * | 11/1970 | Pontani | ................. | B60P 3/1033 414/458 |
| 3,788,502 | A * | 1/1974 | Bell | ....................... | B60P 3/1075 414/534 |
| 3,868,030 | A * | 2/1975 | Bell | ....................... | B60P 3/1075 414/534 |
| 3,896,948 | A * | 7/1975 | Finney | ................... | B60P 3/1058 414/536 |
| 3,993,324 | A * | 11/1976 | Carrick | ................. | B60P 3/1033 280/414.1 |
| 4,010,962 | A * | 3/1977 | Groblebe | ............... | B60P 3/1075 280/414.1 |
| 4,011,958 | A * | 3/1977 | Carrick | ................. | B60P 3/1033 414/529 |
| 4,138,135 | A * | 2/1979 | Hewitt | .................. | B60P 3/1075 280/414.1 |
| 4,209,279 | A * | 6/1980 | Aasen | ................... | B60P 3/1075 280/414.1 |
| 4,243,242 | A * | 1/1981 | Waits | .................... | B60P 3/1033 280/414.1 |
| 4,274,788 | A * | 6/1981 | Sutton | .................. | B60P 3/1033 224/310 |
| 4,318,632 | A * | 3/1982 | Fortmeyer | ............ | B60P 3/1033 280/414.1 |
| 4,340,332 | A * | 7/1982 | Davies | .................. | B60P 3/1075 280/414.1 |
| 4,395,185 | A * | 7/1983 | Whaley | ................. | B60P 3/1033 114/344 |
| 4,529,217 | A * | 7/1985 | Wood | .................... | B60P 3/1075 280/414.1 |
| 4,589,814 | A * | 5/1986 | Cates | .................... | B60P 3/1033 280/414.1 |
| 4,592,694 | A * | 6/1986 | Johnson | ................ | B60P 3/1066 280/414.1 |
| 4,684,145 | A * | 8/1987 | Tingley | ................. | B60P 3/1075 114/344 |
| 4,880,250 | A * | 11/1989 | Cravens | .................... | B60P 3/08 280/414.1 |
| 4,934,895 | A * | 6/1990 | Thibodeaux | .......... | B60P 3/1033 280/414.1 |
| 4,946,332 | A * | 8/1990 | Daniels | ................ | B60P 3/1033 280/401 |
| 5,013,206 | A * | 5/1991 | Ernst | .................... | B60P 3/1033 114/344 |
| 5,152,656 | A * | 10/1992 | Potter | ...................... | B60P 3/08 280/402 |
| 5,195,767 | A * | 3/1993 | Des Roches | .......... | B60P 3/1075 280/414.1 |
| 5,228,713 | A * | 7/1993 | Kovach | ................. | B60P 3/1033 280/414.1 |
| 5,255,933 | A * | 10/1993 | Carrick | ................ | B60P 3/1066 280/414.1 |
| 5,316,329 | A * | 5/1994 | MacKarvich | .......... | B60P 3/1066 193/35 SS |
| 5,468,115 | A * | 11/1995 | Alvis | ...................... | B60P 3/08 280/414.1 |
| 5,562,362 | A * | 10/1996 | Vezner | ..................... | B60P 3/10 114/44 |
| 5,586,856 | A * | 12/1996 | Springer | ................... | B60P 3/10 414/462 |
| 5,590,997 | A * | 1/1997 | Fredriksson | .......... | B60P 3/1033 114/344 |
| 5,634,761 | A * | 6/1997 | Carrick | ................ | B60P 3/1033 280/414.1 |
| 5,649,802 | A * | 7/1997 | Babcock | ................ | B60P 1/025 414/483 |
| 5,653,566 | A * | 8/1997 | Williams | .................. | B60P 3/10 280/402 |
| 5,772,388 | A * | 6/1998 | Clark | ........................ | B60P 3/08 280/414.1 |
| 5,779,250 | A * | 7/1998 | Becht | ...................... | B63C 13/00 280/414.2 |
| 6,079,936 | A * | 6/2000 | Watters | ................ | B60P 3/1066 224/403 |
| 6,203,264 | B1 * | 3/2001 | Combs, Sr. | ........... | B60P 3/1033 280/414.1 |
| 6,217,053 | B1 * | 4/2001 | Forsythe | ............... | B60P 3/1058 114/51 |
| 6,257,167 | B1 * | 7/2001 | Joaquim | ............... | B60P 3/1033 114/344 |
| 6,575,487 | B1 * | 6/2003 | Krause | .................. | B60P 3/1033 114/344 |
| 6,722,683 | B1 * | 4/2004 | Heuiser | .................. | B60P 1/165 280/414.1 |
| 6,823,809 | B2 * | 11/2004 | Hey | ......................... | B63C 3/02 114/45 |
| 6,904,861 | B1 | 6/2005 | Warner et al. | | |
| 6,955,519 | B1 * | 10/2005 | Ferderber | ................ | B60P 3/10 114/259 |
| 7,413,210 | B1 * | 8/2008 | Ross | ..................... | B60P 3/1033 280/414.1 |
| 7,549,665 | B1 * | 6/2009 | Banasco | ................ | B60P 3/1075 280/414.1 |
| 7,690,320 | B1 * | 4/2010 | Tool | ..................... | B60P 3/1066 114/344 |
| 7,971,546 | B1 * | 7/2011 | Sandor, Sr. | ............... | E02B 3/26 114/219 |
| 8,302,986 | B1 * | 11/2012 | Shilts | .................... | B60P 3/1033 280/414.1 |
| 10,156,316 | B2 * | 12/2018 | Fafard | ............... | F16M 11/2014 |
| 2002/0067023 | A1 * | 6/2002 | Bergman | .............. | B60P 3/1041 280/414.1 |
| 2003/0137124 | A1 * | 7/2003 | Marchese | ............ | B60P 3/1075 280/414.1 |
| 2003/0209877 | A1 * | 11/2003 | Beyer | ................... | B60P 3/1066 280/414.1 |

(56) References Cited

U.S. PATENT DOCUMENTS

| | | | | |
|---|---|---|---|---|
| 2006/0001236 A1* | 1/2006 | McGinty | ............... | B60P 3/1066 280/414.1 |
| 2006/0120845 A1* | 6/2006 | Moore | ....................... | B60P 3/10 414/540 |
| 2006/0175798 A1* | 8/2006 | Naito | .................... | B60F 3/0061 280/414.1 |
| 2008/0018077 A1* | 1/2008 | Preece | .................. | B60P 3/1033 280/414.1 |
| 2008/0023937 A1* | 1/2008 | Bryant | .................. | B60P 3/1066 280/414.1 |
| 2009/0072514 A1* | 3/2009 | Hyslop | ................. | B60P 3/1033 280/414.1 |
| 2009/0080974 A1* | 3/2009 | Krause | .................. | B60P 3/1033 405/3 |
| 2009/0267381 A1* | 10/2009 | Huddleston | ........... | B60P 3/1033 296/100.08 |
| 2009/0302572 A1* | 12/2009 | Bryant, II | ............. | B60P 3/1066 280/414.1 |
| 2009/0309328 A1* | 12/2009 | Gionta | .................. | B60P 3/1033 280/414.3 |
| 2011/0020100 A1* | 1/2011 | Kirby | .................... | B60P 3/1058 414/480 |
| 2012/0091688 A1* | 4/2012 | Fink | ....................... | B60P 3/1033 280/414.1 |
| 2012/0318178 A1* | 12/2012 | Hanks | ....................... | B60P 1/00 108/20 |
| 2015/0210201 A1* | 7/2015 | Langenfeld | ........... | B60P 3/1075 280/414.1 |
| 2015/0217671 A1* | 8/2015 | Bryant | .................. | B60P 3/1033 280/414.1 |
| 2016/0325667 A1* | 11/2016 | Pratt | .................... | B62D 53/062 |
| 2017/0028897 A1* | 2/2017 | Pribyl | .................. | B60P 3/1033 |
| 2018/0126893 A1* | 5/2018 | Schierbaum | .......... | B60P 3/1066 |

OTHER PUBLICATIONS

)RJ Cox; Photo of Platform Trolley with Deadman Brake System; available online at http://www.rjcox.com.au/product/2203/99118/jumbo-370kg-platform-trolley-with-deadman-brake-system/ (accessed Nov. 28, 2019).*

HMS London; Photo of Torpedo Cart; available online at https://www.hazegray.org/features/nato/uk/london/london3.jpg (accessed Nov. 28, 2017).

RJ Cox; Photo of Platform Trolley with Deadman Brake System; available online at https://www.rjcox.com.au/product/2203/99118/jumbo-370kg-platform-trolley-with-deadman-brake-system/ (accessed Nov. 28, 2017).

* cited by examiner

REMOVAL/INSTALLATION APPARATUS FOR BOAT CAPTURE SYSTEM

CROSS-REFERENCE TO RELATED APPLICATION

This application claims benefit of the provisional U.S. patent application 62/471,730, filed 15 Mar. 2017, titled "Unmanned Underwater Vehicle Transport and Recovery Devices" (Navy Case # 104026).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104029.

BACKGROUND OF THE INVENTION

Boat capture systems have been developed that help guide a boat onto a trailer, for example when the trailer is partially submerged on a boat launching ramp (e.g., See FIG. 1B). Such systems typically employ side guides that are connected to the trailer and extend above the water line and provide both optical and physical guidance to a boat as it moves towards, and then onto, the trailer. Often these side guides need to be removed from the trailer, for example to facilitate transportation of the boat and trailer on a roadway and/or the loading/unloading of equipment onto/off of the boat while the boat is mounted on the trailer. Due to the weight and size of the side guides, the removal and installation process is often accomplished with a forklift.

SUMMARY

Described herein is an apparatus and method for removing and/or installing a side guide of a trailer-mounted boat capture system for guiding a boat onto the trailer. The removal/installation apparatus comprises at least one outboard post, two inboard posts an attachment point, and attaching pins (described as second pins below). The outboard post is pivotally attached to an upper support rail of the side guide. The two inboard posts are each pivotally attached to the side guide proximal to where the side guide is attached to the trailer via first pins. Each inboard post includes a manual leveling jack. The attachment point is located on the side guide and is suitable for attaching a winch cable from a boat held in the boat capture system. The second pins attach the side guide to the trailer such that when the first pins are removed the side guide is free to pivot around the second pins from an upright position towards a support surface.

The method for removing a side guide of a trailer-mounted boat capture system comprises the following steps. One step provides for pivoting and locking the outboard posts connected to the side guide into an extended position. Another step provides for extending the outboard posts to a desired length. Another step provides for pivoting and locking inboard posts connected to the side guide into an extended position. Another step provides for attaching a winch cable to the side guide. Another step provides for removing first pins from the side guide that attach the side guide to the trailer. Another step provides for lowering the side guide with the winch cable towards a support surface after the first pins are removed such that the side guide pivots around the second pins towards the support surface until distal ends of the extended outboard posts come in contact with the support surface and the winch cable slackens. Another step provides for releasing the winch cable from the side guide. Another step provides for adjusting the leveling jacks mounted to the inboard posts until distal ends of the inboard posts come in contact with the support surface and until enough weight of the side guide is carried by the inboard posts to allow the second pins to be removed from the trailer. Another step provides for removing the second pins. Another step provides for moving the side guide away from the trailer.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
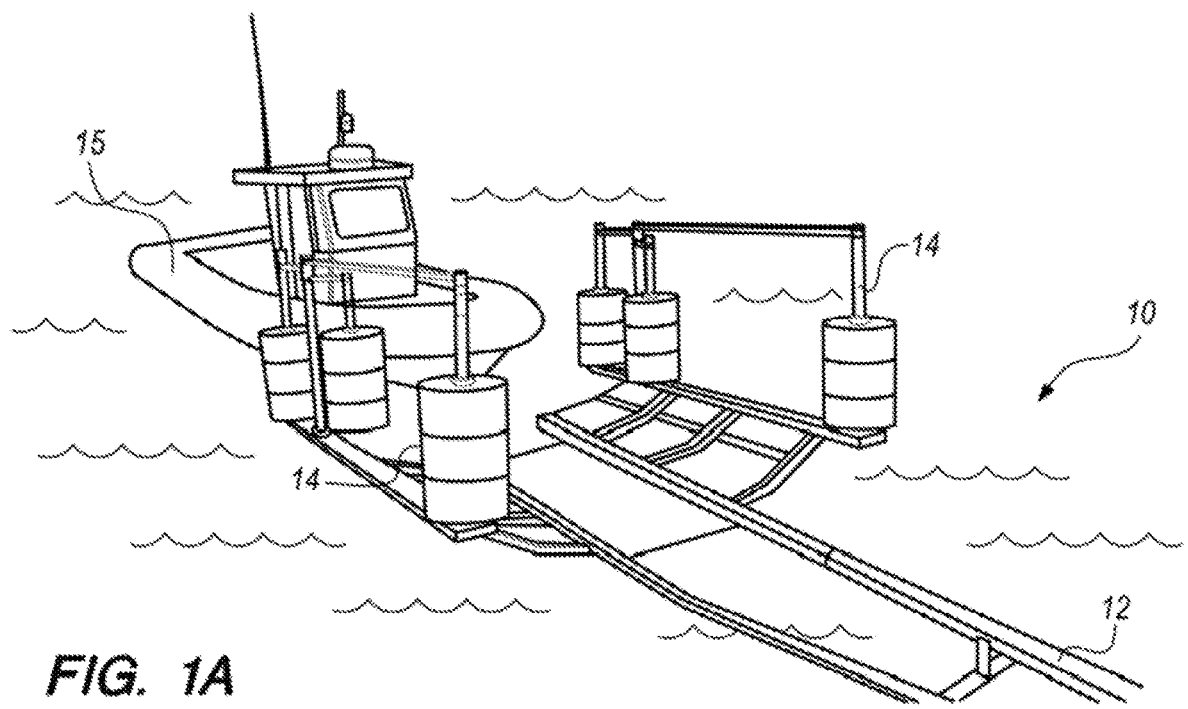
FIG. 1A is an image of a boat approaching a trailer-mounted boat capture system.
Figure 1B:
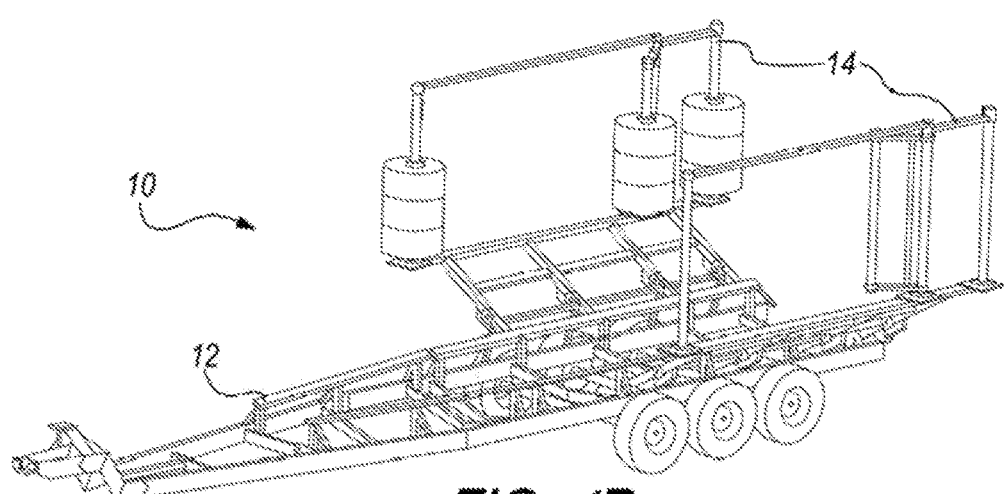
FIG. 1B is a perspective-view illustration of an embodiment of a trailer-mounted boat capture system.

FIGS. 1A and 1B show an example of a prior art boat capture system 10 mounted on a trailer 12. The boat capture system 10 comprises two side guides 14 for guiding a boat 15 onto the trailer 12. The boat capture system 10 and the trailer 12 shown in FIGS. 1A and 1B are provided as a representation of all such trailer-mounted boat capture systems and reference hereafter to the boat capture system 10 refers to any trailer-mounted boat capture system having side guides for guiding a boat onto a trailer.

Figure 2A:
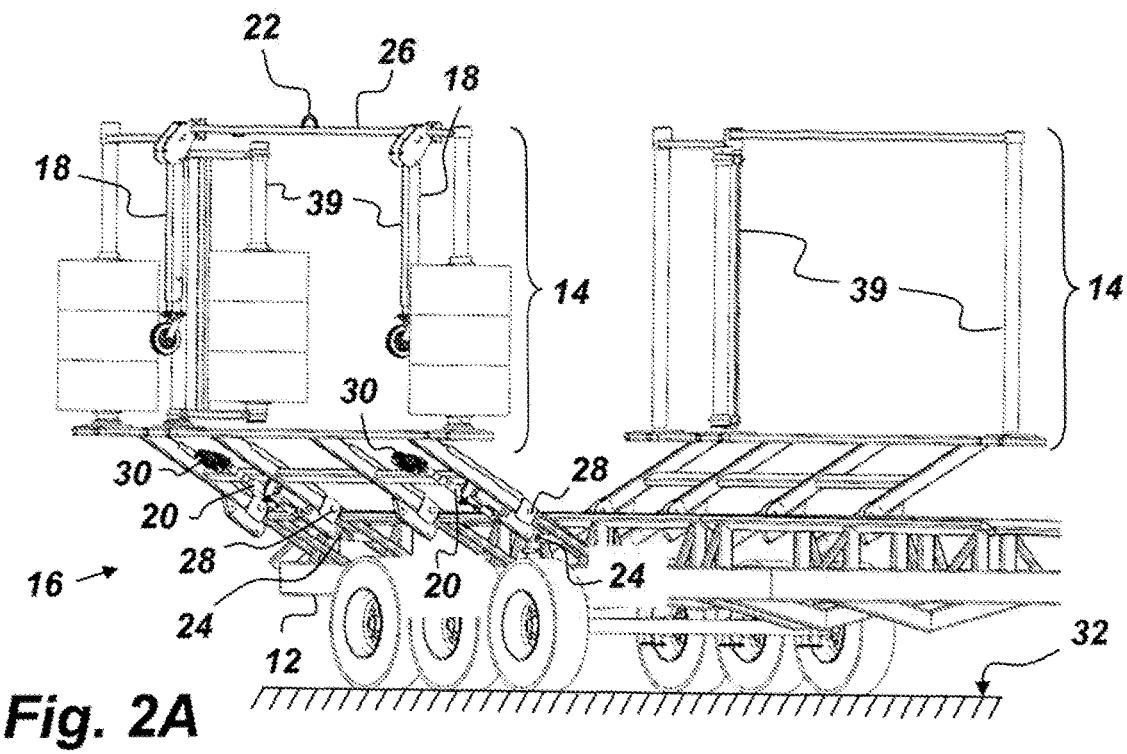
FIG. 2A is a perspective-view illustration of an embodiment of a removal/installation apparatus connected to a trailer-mounted boat capture system with side guides in an upright position.
Figure 2B:
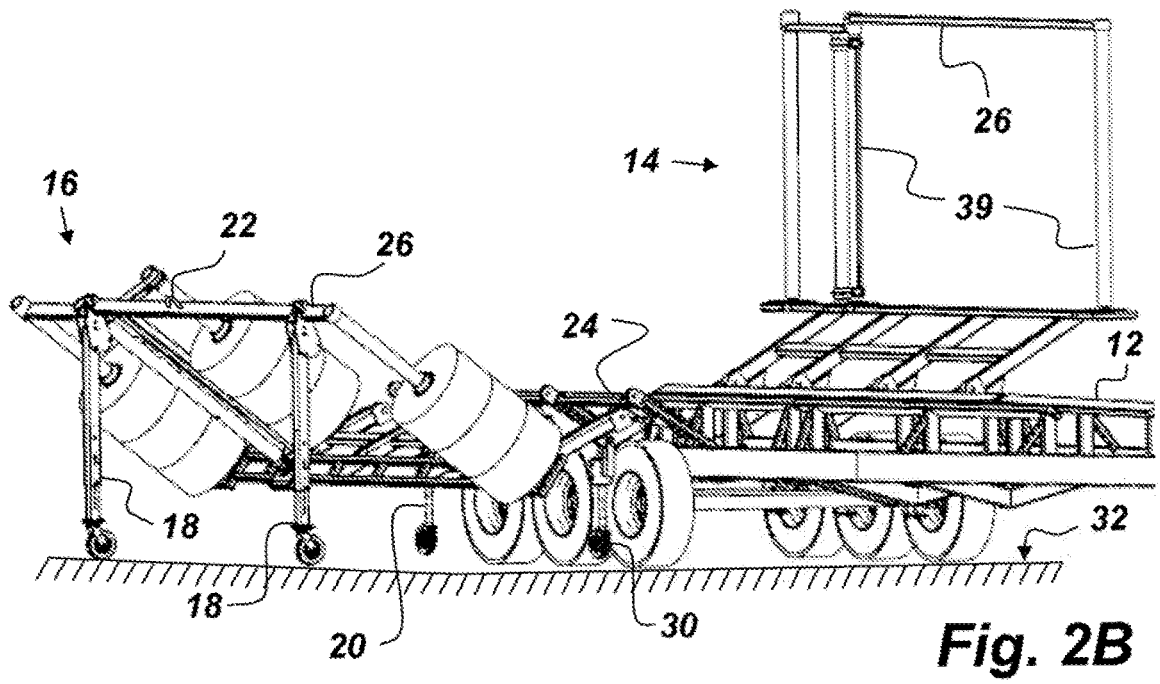
FIG. 2B is a perspective-view illustration of an embodiment of a removal/installation apparatus connected to a trailer-mounted boat capture system with side guides in an outspread position.

FIGS. 2A and 2B are illustrations of an embodiment of an apparatus (hereinafter referred to as the removal/installation apparatus 16) for removing and/or installing a side guide 14 of the boat capture system 10. FIG. 2A shows both the side guides 14 in an upright position. FIG. 2B shows one of the side guides 14 in an outspread position. The removal/installation apparatus 16 is not limited to use with the specific boat capture system 10 shown in FIG. 1 but may be used with any trailer-mounted boat capture system having side guides for guiding a boat onto a trailer. The removal/installation apparatus 16 comprises, consists of, or consists essentially of at least one outboard post 18, at least two inboard posts 20, a cable attachment point 22, and second pins 24. The outboard post 18 is pivotally attached to an upper support rail 26 of the side guide 14. The removal/installation apparatus 16 must have a minimum of one outboard post 18. Although FIGS. 2A and 2B show the removal/installation apparatus 16 as having two outboard posts 18, it is to be understood that the removal/installation apparatus 16 is not limited to two outboard posts 18 but may have any desired number of outboard posts 18 provided it has at least one. The two inboard posts 20 are each pivotally attached to the side guide 14 proximal to where the side guide 14 is attached to the trailer 12 via first pins 28. Each inboard post 20 includes a manual leveling jack 30. The cable attachment point 22 is mounted on the side guide 14 and is suitable for attaching a winch cable from a boat held in the boat capture system 10 (such as is shown in FIGS. 5B and 5C). The attachment point 22 may be an eye attached to the side guide 14 or simply be an open section of the upper support rail 26 where a line or cable may be attached to the side guide 14. The second pins 24 attach the side guide 14 to the trailer 12 such that when the first pins 28 are removed the side guide 14 is free to pivot around the second pins 24 from an upright position (as shown in FIG. 2A) towards a support surface 32 to an outspread position (as shown in FIG. 2B).

Figure 3:
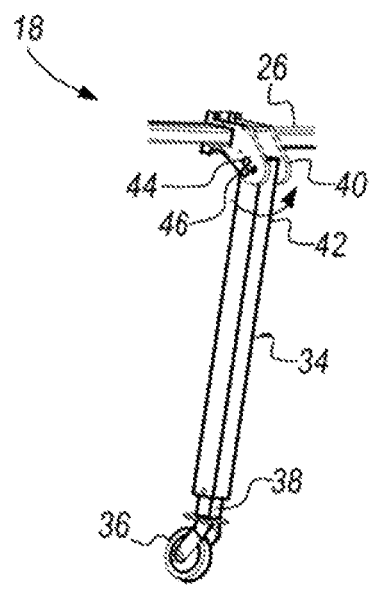
FIG. 3 is an illustration of an outboard post.

FIG. 3 is an illustration of an outboard post 18. Each outboard post 18 comprises an adjustable, telescoping tube 34, which may terminate in a swiveling caster wheel 36 at its distal end 38. The outboard posts 18 should be constructed of a material that is strong and rigid enough to support the weight of the side guide 14. A suitable material for the outboard post 18 includes, but is not limited to, aluminum. When the removal/installation apparatus 16 is not being used, the outboard and inboard posts 18 and 20 may be stored in folded positions. An example of the folded positions is shown in FIG. 2A where each outboard post 18 is in a folded position where the outboard post 18 is substantially parallel to a series of boat guide posts 39 of the side guide 14. In the embodiment of the outboard post 18 shown in FIG. 3, the outboard post 18 is attached to the upper support rail 26 via an attachment bracket 40. A proximal end 42 of the telescoping tube 34 is attached to the attachment bracket 40 via a first support pin 44, around which the telescoping tube 34 may pivot. The telescoping tube may be secured in either the folded position (such as is shown in FIG. 2A) or an extended position (as example of which is shown in FIG. 2B) via a second support pin 46. The telescoping tube 34 allows the length of the outboard post 18 to be adjusted to accommodate different support surfaces 32.

Figure 4:
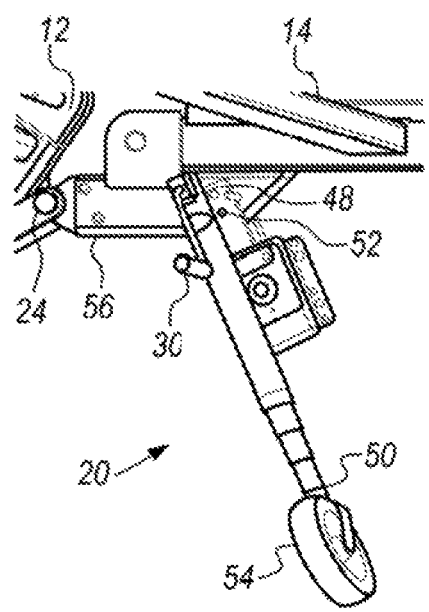
FIG. 4 is an illustration of an inboard post.

FIG. 4 is an illustration of an example embodiment of an inboard post 20. In this illustration, the side guide 14 is in the outspread position, such as is displayed in FIG. 2B, where the first pins 28 (shown in FIG. 2A) have been removed and the side guide 14 has pivoted away from the trailer 12. In this embodiment (i.e., the one shown in FIG. 4), the inboard post 20 is free to pivot on a third support pin 48 to/from a folded position such as is shown in FIG. 2A and an unfolded position such as is shown in FIGS. 2B and 4. Each inboard post 20 may be locked in either the unfolded or folded position with a locking pin 52. The length of each inboard post 20 may be adjusted by the leveling jack 30. Each inboard post 20 comprises a distal end 50 that may be attached to a swiveling caster wheel 54. The embodiment of the side guide 14 shown in FIG. 4 comprises stop members 56 such that when the side guide 14 is in the upright position the stop members 56 are biased against the trailer 12 by gravity. Eyes for the second pins 24 may be attached to the stop members 56 and the trailer 12. With this embodiment of the side guide 14, when the first pins 28 are in place and the second pins 24 are removed and a boat is not on the trailer 12 the side guide 14 is capable of pivoting between the upright position and a stowed position. In the stowed position, the side guide 14 has pivoted towards the center of the trailer 12 until the side guide 14 rests on the trailer 12.

Figure 5A:
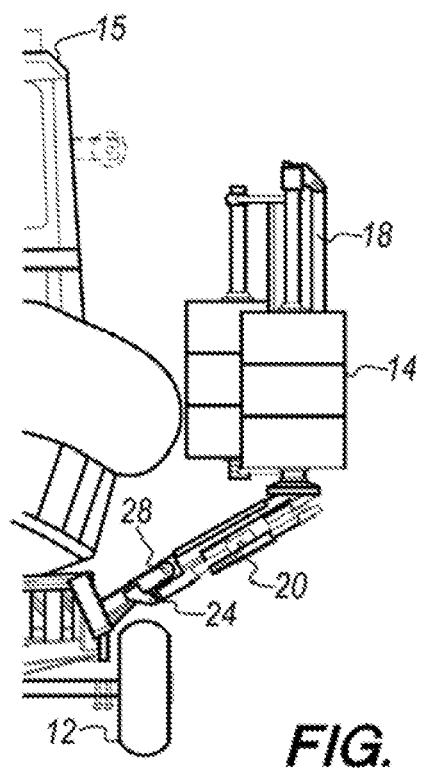
FIGS. 5A-5C are a series of front-view illustrations showing how a removal/installation apparatus may be used to remove a side guide from a boat capture system.
Figure 5B:
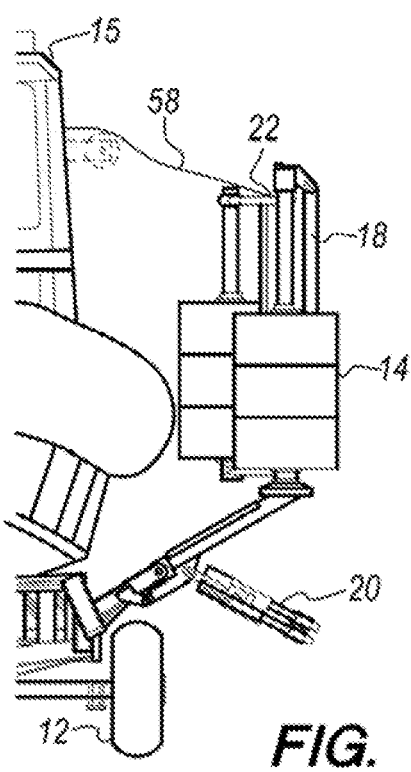
Figure 5C:
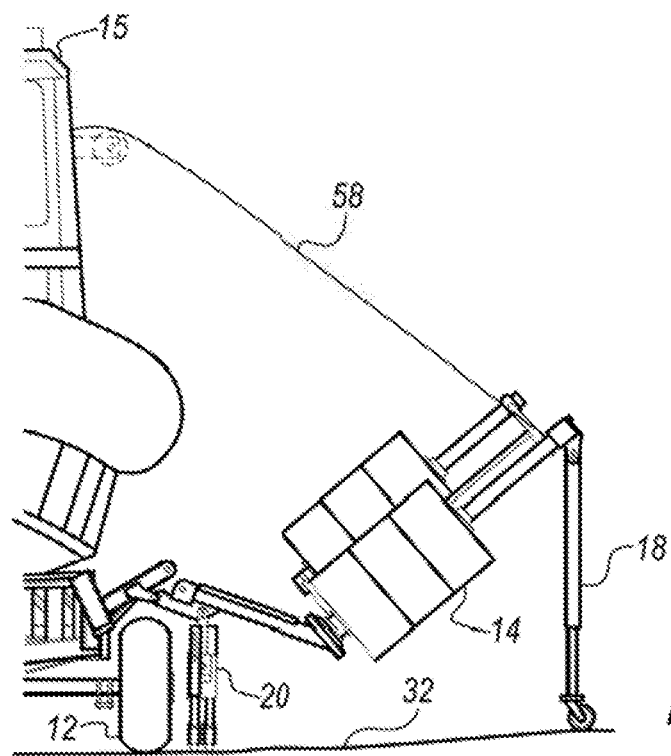

FIGS. 5A-5C are a series of front-view illustrations showing how the removal/installation apparatus 16 may be used to remove the side guide 14 from the boat capture system 10 without the use of hand tools or a forklift. FIG. 5A shows the side guide 14 being held in the upright position with both the first pins 28 and the second pins 24 in place. FIG. 5A also shows the inboard posts 20 in the folded position and the outboard post 18 is in the folded position. In FIG. 5B, the inboard posts 20 are moved to the unfolded position and a cable 58 from a winch on the boat 15 is attached to the attachment point 22. Note, a winch is not required, but it is preferable. In FIG. 5C, the outboard post 18 has been moved to the extended position, the first pins have been removed, and the cable 58 has lowered the side guide 14 until the outboard post 18 has come in contact with the support surface 32. Also shown in FIG. 5C, the leveling jacks have been used to bring the inboard posts 20 into contact with the support surface 32.

Figure 6:
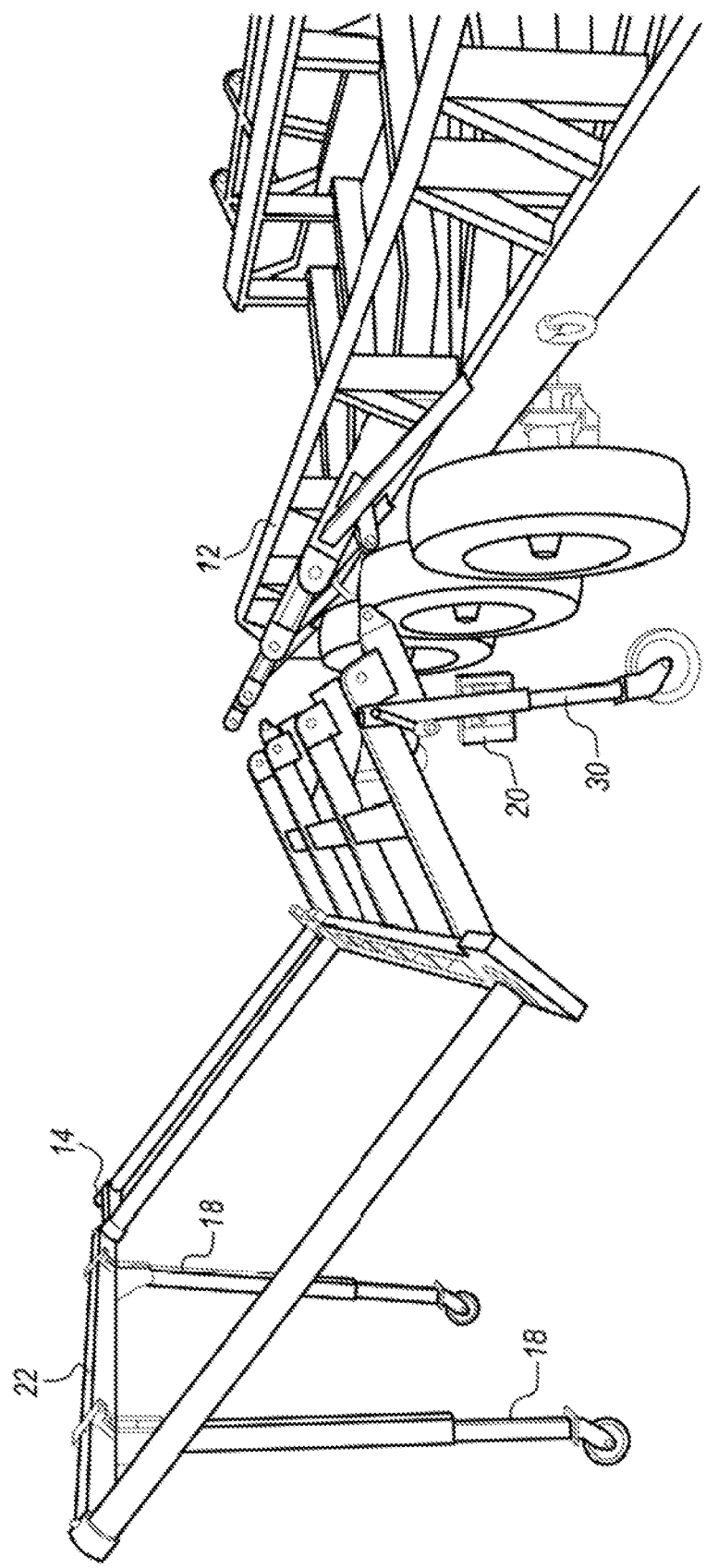
FIG. 6 is an illustration of a side guide being supported by a removal/installation apparatus and separated from a trailer.

FIG. 6 shows how once the leveling jacks 30 have been used to take the weight of the side guide 14 off of the second pins 24, the second pins 24 may be removed, the cable may be detached from the attachment point 22 and the side guide 14 may be rolled away from the trailer 12 on the removal/installation apparatus 16. With the side guide 14 moved away from the trailer 12, the boat 15 may be serviced and items may be loaded/unloaded onto/off of the boat while it is still sitting on the trailer. This capability is beneficial in many scenarios. For example, moving unmanned underwater vehicles (UUVs) from mobile carts to a small boat (such as the boat 15) used for launch and recovery requires lifting and placement of the UUVs, which can weigh over 362 kg (800 lbs.) and measure over 4 meters long. Often the small boat is on a special trailer which is used to launch the boat itself. The trailer has lateral restraints (such as the side guides 14) that impair a side-by-side transfer of the UUV to the boat. Heretofore, the trailer's side guide assemblies were not readily removable without specialized heavy-lifting equipment such as a forklift with a special attachment.

Figure 7:
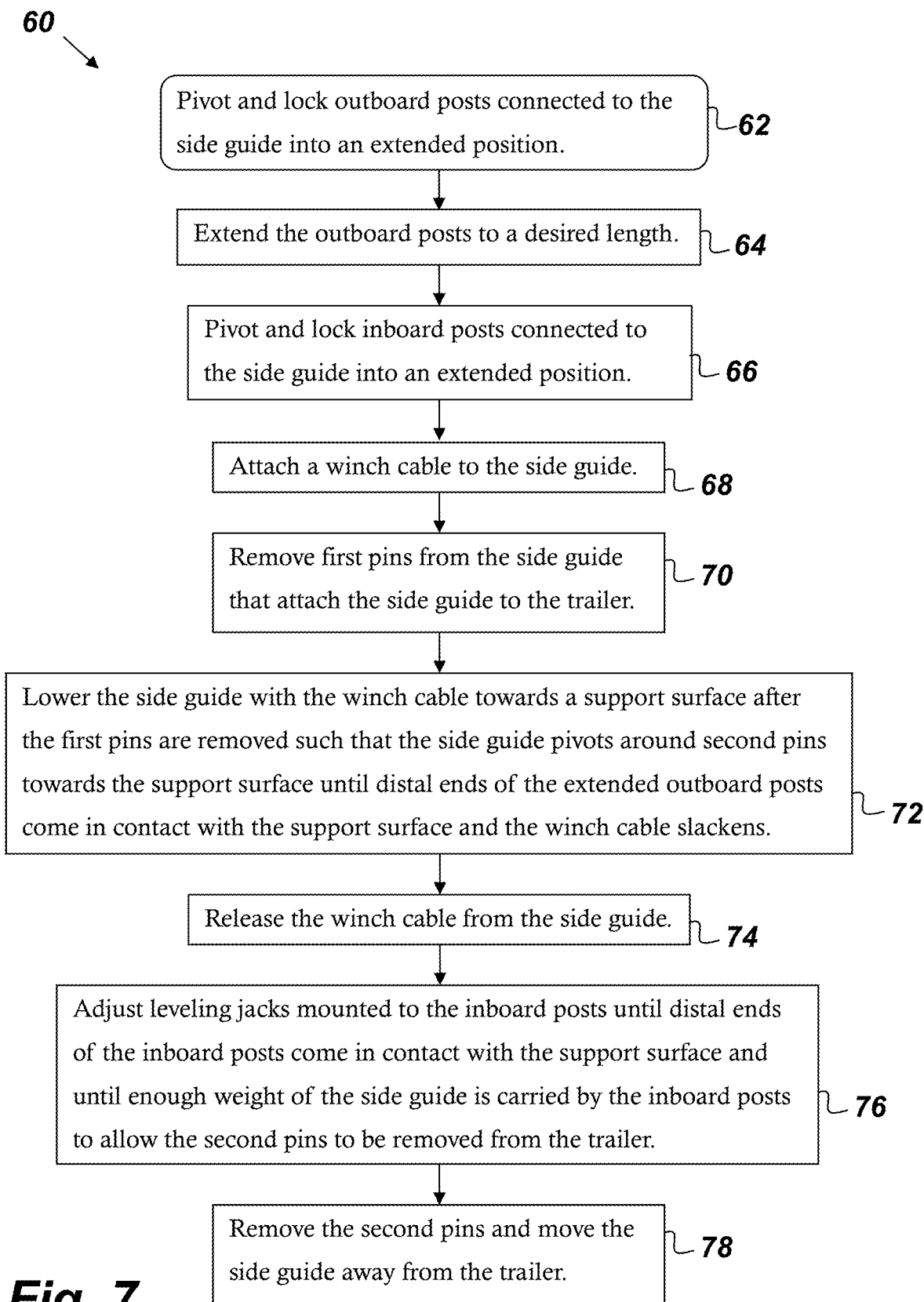
FIG. 7 is a flowchart of a method for removing and/or installing a side guide of a trailer-mounted boat capture system.

FIG. 7 is a flowchart of a method 60 for removing a side guide of a trailer-mounted boat capture system. Method 60 comprises the following steps. One step 62 provides for pivoting and locking outboard posts connected to the side guide into an extended position. Another step 64 provides for extending the outboard posts to a desired length. Another step 66 provides for pivoting and locking inboard posts connected to the side guide into an extended position. Another step 68 provides for attaching a winch cable to the side guide. Another step 70 provides for removing first pins from the side guide that attach the side guide to the trailer. Another step 72 provides for lowering the side guide with the winch cable towards a support surface after the first pins are removed such that the side guide pivots around second pins towards the support surface until distal ends of the extended outboard posts come in contact with the support surface and the winch cable slackens. Another step 74 provides for releasing the winch cable from the side guide. Another step 76 provides for adjusting leveling jacks mounted to the inboard posts until distal ends of the inboard posts come in contact with the support surface and until enough weight of the side guide is carried by the inboard posts to allow the second pins to be removed from the trailer. Another step 78 provides for removing the second pins and moving the side guide away from the trailer. It is to be understood that the steps articulated above may be practiced in any desired order and one step does not necessarily follow another unless specifically stated.

From the above description of the removal/installation apparatus 16 and method 60, it is manifest that various techniques may be used for implementing the disclosed concepts without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the removal/installation apparatus 16 and method 60 is not limited to the particular embodiments described herein, but is capable of many embodiments without departing from the scope of the claims.

We claim:

1. An apparatus for removing and/or installing a side guide of a trailer-mounted boat capture system for guiding a boat onto the trailer, the apparatus comprising:
    an outboard post pivotally attached to an upper support rail of the side guide;
    two inboard posts, each pivotally attached to the side guide proximal to where the side guide is attached to the trailer via first pins, wherein each inboard post includes a manual leveling jack;
    an attachment point on the side guide suitable for attaching a winch cable from a boat held in the boat capture system; and
    second pins attaching the side guide to the trailer such that when the first pins are removed the side guide is free to pivot around the second pins from an upright position towards a support surface.

2. The apparatus of claim 1, wherein the outboard post comprises an adjustable, telescoping tube.

3. The apparatus of claim 2, wherein the outboard post further comprises proximal and distal ends, wherein a swivel caster wheel is attached to the distal end and the proximal end is pivotally attached to the upper rail.

4. The apparatus of claim 3, wherein the outboard post is configured to pivot to and from a folded position in which the outboard post is substantially parallel to a series of boat guide posts of the side guide and an extended position in which the outboard post pivots away from the side guide plane by 30 to 90 degrees in a direction away from the trailer.

5. The apparatus of claim 1, further comprising at least two outboard posts.

6. The apparatus of claim 1, wherein each of the inboard posts has a distal end attached to a swiveling caster wheel.

7. The apparatus of claim 1, wherein when the first pins are in place and the second pins are removed and a boat is not on the trailer the side guide is capable of pivoting between an upright position and a stowed position, wherein in the stowed position the side guide has pivoted towards the center of the trailer until the side guide rests on the trailer, and wherein the side guide further comprises stop members such that when the side guide is in the upright position the stop members are biased against the trailer by gravity.

8. The apparatus of claim 7, wherein when the first pins are removed and the second pins are in place the side guide is capable of pivoting from the upright position to an outspread position where the outboard post is in contact with the support surface.

9. The apparatus of claim 8, wherein when both the first and second pins are in place, the side guide is held in the upright position.

10. The apparatus of claim 9, wherein the second pins fit through eyes in the trailer and eyes in the stop members, wherein the eyes are aligned when the side guide is in the upright position.

11. The apparatus of claim 9, wherein when both the first and second pins are removed and the winch cable is detached from the attachment point the side guide is completely detached from the trailer.

12. A method for removing a side guide of a trailer-mounted boat capture system comprising the following steps:
    pivoting and locking outboard posts connected to the side guide into an extended position;
    extending the outboard posts to a desired length;
    pivoting and locking inboard posts connected to the side guide into an extended position;
    attaching a winch cable to the side guide;
    removing first pins from the side guide that attach the side guide to the trailer;
    after the first pins are removed, lowering the side guide with the winch cable towards a support surface such that the side guide pivots around second pins towards the support surface until distal ends of the extended outboard posts come in contact with the support surface and the winch cable slackens, wherein the second pins also attach the side guide to the trailer;
    releasing the winch cable from the side guide;
    adjusting leveling jacks mounted to the inboard posts until distal ends of the inboard posts come in contact with the support surface and until enough weight of the side guide is carried by the inboard posts to allow the second pins to be removed from the trailer;
    removing the second pins; and
    moving the side guide away from the trailer.

13. The method of claim 12, wherein the winch cable is from a boat secured on the trailer in the boat capture system.

14. The method of claim 12, wherein the distal ends of the outboard and inboard posts comprise wheels and the step of moving the side guide away from the trailer is performed by rolling the side guide away via the wheels.

15. The method of claim 12, wherein no forklift is used for any of the steps.

16. The method of claim 13, further comprising the step of loading or unloading an unmanned underwater vehicle (UUV) onto/off of the boat while the boat is secured on the trailer and while side guide is off.

17. The method of claim 12, wherein the steps of method 12 are performed without the use of hand tools.

18. The method of claim 12, wherein the steps of method 12 are performed without overhead lifting.

19. The method of claim 12, wherein the support surface is a deck of a ship and the steps of method 12 are performed while the trailer is on the ship.

20. The method of claim 16, wherein the support surface is a deck of a ship and the steps are performed while the trailer is on the ship.

\* \* \* \* \*